(12) United States Patent
Hasegawa et al.

(10) Patent No.: US 11,216,667 B2
(45) Date of Patent: Jan. 4, 2022

(54) INFORMATION PROCESSING APPARATUS, METHOD FOR INFORMATION PROCESSING, AND STORAGE MEDIUM

(71) Applicant: CANON KABUSHIKI KAISHA, Tokyo (JP)

(72) Inventors: Kunihiro Hasegawa, Kawasaki (JP); Xunqiang Tao, Tokyo (JP); Mizuki Matsubara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/000,053

(22) Filed: Aug. 21, 2020

(65) Prior Publication Data

US 2020/0387715 A1 Dec. 10, 2020

Related U.S. Application Data

(63) Continuation of application No. PCT/JP2019/006447, filed on Feb. 21, 2019.

(30) Foreign Application Priority Data

| Feb. 27, 2018 | (JP) | ............................. JP2018-033046 |
| Feb. 8, 2019 | (JP) | ............................. JP2019-021476 |

(51) Int. Cl.
  *G06K 9/00* (2006.01)
  *G06K 9/62* (2006.01)

(52) U.S. Cl.
  CPC ....... *G06K 9/00718* (2013.01); *G06K 9/6217* (2013.01)

(58) Field of Classification Search
  None
  See application file for complete search history.

(56) References Cited

U.S. PATENT DOCUMENTS

2020/0012866 A1* 1/2020 Burghouts ............ G06F 16/786

FOREIGN PATENT DOCUMENTS

| JP | 2008-108008 A | 5/2008 |
| JP | 2013-235346 A | 11/2013 |
| JP | 2018-005752 A | 1/2018 |
| JP | 2018-022210 A | 2/2018 |

* cited by examiner

*Primary Examiner* — David Perlman
(74) *Attorney, Agent, or Firm* — Canon U.S.A., Inc. IP Division

(57) ABSTRACT

An acquisition unit acquires frames constituting an image. An operation specification unit specifies operation details based on the image of the frames by way of machine learning using a learning model. A period specification unit corrects the operation details associated with the image of the frames based on time series relationship between a first period and a second period of periods included in the image and based on a predetermined operation order of a plurality of operation details and to specify a period of each operation corresponding to the operation order, the first period corresponding to continuous frames in which a first operation detail is specified by the operation specification unit, the second period being different from the first period and corresponding to continuous frames in which a second operation detail is specified.

19 Claims, 17 Drawing Sheets

| NO. | START FRAME | END FRAME | OPERATION LABEL |
|---|---|---|---|
| 10 | 100 | 150 | 1 |
| 11 | 155 | 170 | 2 |
| 12 | 173 | 197 | 4 |
| 13 | 200 | 210 | 3 |
| | ... | | |
| 20 | 281 | 299 | 4 |
| 21 | 300 | 315 | 6 |
| 22 | 320 | 356 | 7 |
| | ... | | |

| START FRAME | END FRAME | OPERATION LABEL |
|---|---|---|
| 100 | 150 | 1 |
| 155 | 170 | 2 |
| 200 | 210 | 3 |
| ... | | |
| 281 | 299 | 4 |
| 300 | 315 | 6 |
| 320 | 356 | 7 |
| ... | | |

GIVE WARNING OF MISSING OPERATION

1000

| START FRAME | END FRAME | OPERATION LABEL | LIKELIHOOD |
|---|---|---|---|
| ... | | | |
| 100 | 150 | 1 | 0.6 |
| 155 | 170 | 2 | 0.7 |
| 200 | 210 | 3 | 0.9 |
| 281 | 299 | 4 | 1.0 |
| 300 | 315 | 5 | 0.2 |
| 320 | 356 | 6 | 0.8 |
| ... | | | |

1100

| START FRAME | END FRAME | OPERATION LABEL | LIKELIHOOD |
|---|---|---|---|
| ... | | | |
| 780 | 794 | 3 | 0.8 |
| 842 | 860 | 4 | 0.7 |
| 565 | 891 | 6 | 0.4 |
| ... | | | |

⇒ MISSING OPERATION

FIG. 11

| NO. | 1 | 2 | 3 | 4 | 5 | 6 | ... |
|---|---|---|---|---|---|---|---|
| OPERATION LABEL (CORRECT) | 1 | 2 | 3 | 3 | 3 | 4 | ... |
| OPERATION LABEL (SPECIFIED) | 1 | 2 | 3 | 4 | 3 | 4 | ... |
| NUMBER OF FRAMES | 20 | 20 | 30 | 10 | 20 | 50 | ... |

SPECIFY OPERATION LABEL "3"

FIG. 14

| OPERATION LABEL | 1 | 2 | 3 | 4 |
|---|---|---|---|---|
| EXPECTED VALUE | 18 | 21 | 55 | 50 |

FIG. 15

| NO. | 1 | 2 | ... | 5 | 6 | 7 | |
|---|---|---|---|---|---|---|---|
| OPERATION LABEL (CORRECT) | 1 | 2 | ... | 5 | 6 | 6 | |
| OPERATION LABEL (SPECIFIED) | 1 | 2 | ... | 5 | 1 | 6 | |
| NUMBER OF FRAMES | 20 | 20 | ... | 20 | 15 | 50 | |

FIG. 17

| OPERATION LABEL | 1 | ... | 6 | ... |
|---|---|---|---|---|
| SIMILAR OPERATION | 6,8 | ... | 1,8 | ... |

INFORMATION PROCESSING APPARATUS, METHOD FOR INFORMATION PROCESSING, AND STORAGE MEDIUM

CROSS-REFERENCE TO RELATED APPLICATIONS

This application is a Continuation of International Patent Application No. PCT/JP2019/006447, filed Feb. 21, 2019, which claims the benefit of Japanese Patent Application No. 2018-033046, filed Feb. 27, 2018, and Japanese Patent Application No. 2019-021476, filed Feb. 8, 2019, all of which are hereby incorporated by reference herein in their entirety.

BACKGROUND OF THE INVENTION

Field of the Invention

The present invention relates to an information processing apparatus a method for information processing, and a storage medium.

Background Art

There are known in the related art a method for detecting what kind of operation a person in an image is performing and a method for detecting the timing of the operation from the result. PTL 1 discloses a recognition apparatus that recognizes the situation from time-series data by way of machine learning using a learning model.

CITATION LIST

Patent Literature

PTL 1: Japanese Patent Laid-Open No. 2013-235346

However, the image recognition using machine learning, as described above, may cause misrecognition. Meanwhile, the machine learning that takes time series into account may take much time and cannot collect sufficient learning data.

The present invention is made in view of the above problems. Accordingly, an embodiment of the invention can increase the accuracy of specifying the operation details.

SUMMARY OF THE INVENTION

According to one embodiment of the present invention, an information processing apparatus comprises an acquisition unit configured to acquire frames constituting an image; an operation specification unit configured to specify operation details based on the image of the frames by way of machine learning using a learning model; and a period specification unit configured to correct the operation details associated with the image of the frames based on time series relationship between a first period and a second period of periods included in the image and based on a predetermined operation order of a plurality of operation details and to specify a period of each operation corresponding to the operation order, the first period corresponding to continuous frames in which a first operation detail is specified by the operation specification unit, the second period being different from the first period and corresponding to continuous frames in which a second operation detail is specified.

According to another embodiment of the present invention, an information processing apparatus comprises an acquisition unit configured to acquire frames constituting an image; a score specification unit configured to specify a score for each of a plurality of operations based on the image of the frames; and a period specification unit configured to specify an operation period based on a score sequence in which scores of a plurality of frames included in a predetermined period are combined and a predetermined operation order of the plurality of operations.

According to still another embodiment of the present invention, a method for information processing comprises acquiring frames constituting an image; specifying operation details based on the image of the frames by way of machine learning using a learning model; and correcting the operation details associated with the image of the frames based on time series relationship between a first period and a second period of periods included in the image and based on a predetermined operation order of a plurality of operation details and specifying a period of each operation corresponding to the operation order, the first period corresponding to continuous frames in which a first operation detail is specified by an operation specification unit, the second period being different from the first period and corresponding to continuous frames in which a second operation detail is specified.

According to yet another embodiment of the present invention, a method for information processing comprises acquiring frames constituting an image; specifying a score for each of a plurality of operations based on the image of the frames; and specifying an operation period based on a score sequence in which scores of a plurality of frames included in a predetermined period are combined and a predetermined operation order of the plurality of operations.

According to still yet another embodiment of the present invention, a storage medium stores a computer program for causing a computer to execute a method, the method comprising: acquiring frames constituting an image; specifying operation details based on the image of the frames by way of machine learning using a learning model; and correcting the operation details associated with the image of the frames based on time series relationship between a first period and a second period of periods included in the image and based on a predetermined operation order of a plurality of operation details and specifying a period of each operation corresponding to the operation order, the first period corresponding to continuous frames in which a first operation detail is specified by an operation specification unit, the second period being different from the first period and corresponding to continuous frames in which a second operation detail is specified.

The present invention provides an information processing apparatus including an acquisition unit configured to acquire frames constituting an image, an operation specification unit configured to specify operation details based on the image of the frames by way of machine learning using a learning model, and a period specification unit configured to correct the operation details associated with the image of the frames based on time series relationship between a first period and a second period of periods included in the image and based on a predetermined operation order of the plurality of operation details and to specify a period of each operation corresponding to the operation order, the first period corresponding to continuous frames in which a first operation detail is specified by the operation specification unit, the second period being different from the first period and corresponding to continuous frames in which a second operation detail is specified.

Further features of the present invention will become apparent from the following description of exemplary embodiments with reference to the attached drawings.

BRIEF DESCRIPTION OF THE DRAWINGS

The accompanying drawings are included in the specification, constitute part thereof, illustrate embodiments of the present invention, and are used to describe the principle of the present invention together with the description.

FIG. 11 is an explanatory diagram illustrating correction processing according to a third embodiment.

FIG. 14 is a diagram illustrating examples of an expected value.

FIG. 15 is an explanatory diagram illustrating correction processing according to a fifth embodiment.

FIG. 17 is a diagram illustrating a similarity table.

DESCRIPTION OF THE EMBODIMENTS

Embodiments of the present invention will be described hereinbelow with reference to the drawings.

First Embodiment

Figure 1:
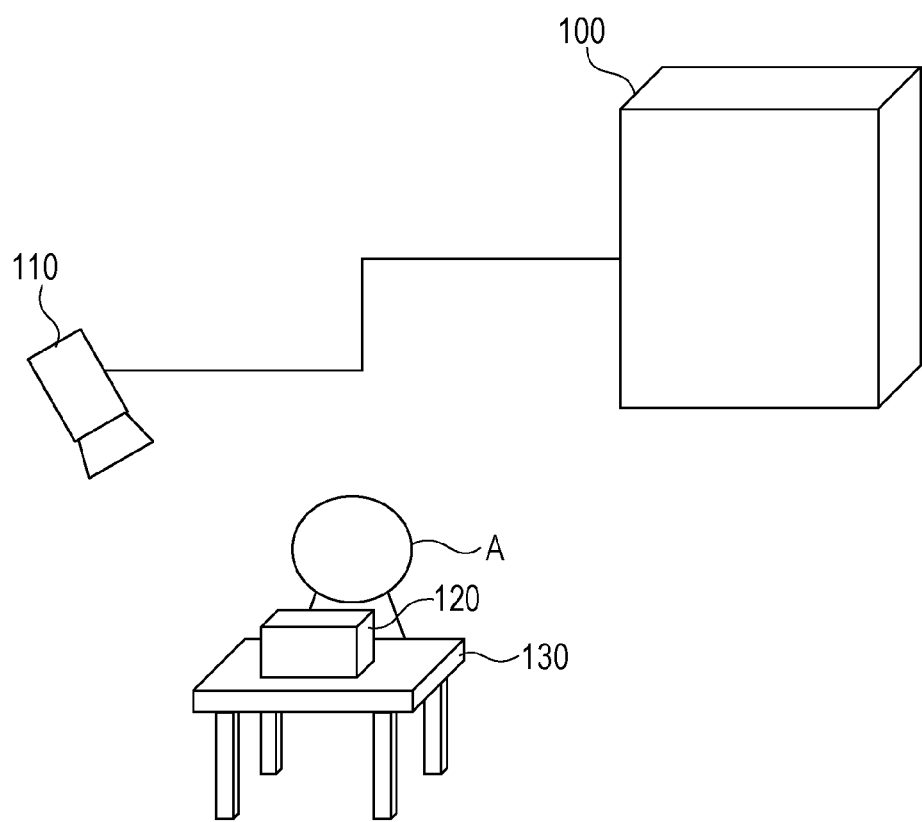
FIG. 1 is an overall view of an operation specification system according to a first embodiment.

FIG. 1 is an overall view of an operation specification system according to a first embodiment. The operation specification system includes a server 100 and an image capturing apparatus 110. The server 100 and the image capturing apparatus 110 communicate with each other using, for example, Transmission Control Protocol/Internet Protocol (TCP/IP). The server 100 and the image capturing apparatus 110 may use another communication protocol. The image capturing apparatus 110 captures an image of a series of operations that a person A performs on an object 120 and transmits the image to the server 100. The object 120 is an object to be operated. The object 120 is not limited to a size that fits on a desk 130, as illustrated in FIG. 1, and may be of a size that fits on a palm or a finger, such as a screw, or of a large size that is placed on a floor. A series of operations that the person A performs includes a plurality of operations, and the order of the operations is determined in advance. The series of operations includes, for example, operation A, operation B, and operation C, which are executed in this order. The server 100 of the present embodiment manages the series of operations by assigning serial integers to the operations as labels in the order of operations, such as 1, 2, and 3. Symbols to be used for the labels are not limited to those of the embodiment and may be any symbols that identify the individual operations. Other examples of the symbols for use as labels include an odd number sequence, such as 1, 3, and 5, and an alphabetical sequence, such as a, b, and c. The server 100 is an example of the information processing apparatus.

Figure 2:
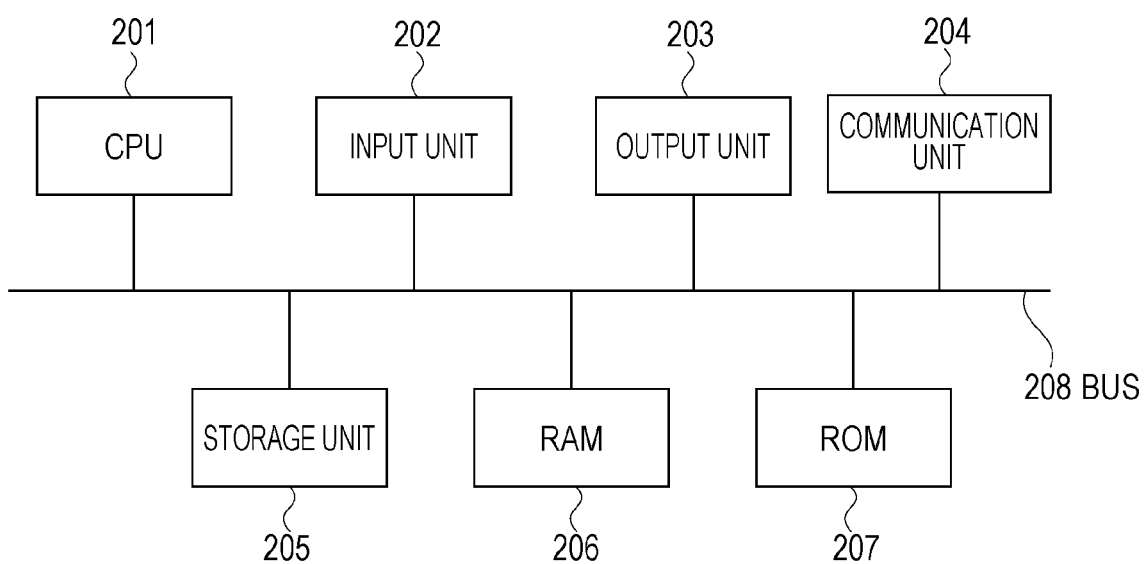
FIG. 2 is a hardware configuration diagram of a server.

FIG. 2 is a hardware configuration diagram of the server 100. A central processing unit (CPU) 201 executes processing using computer programs and data stored in a random access memory (RAM) 206 and a read only memory (ROM) 207. Thus, the CPU 201 controls the operation of the entire server 100 and executes or controls the processes to be performed by the server 100, described later.

An input unit 202 is a user interface, such as buttons, with which various kinds of input operation can be performed on the server 100 by the user. An output unit 203 includes a display, such as a liquid-crystal screen, and a speaker, with which the processing result of the CPU 201 can be displayed or output by voice. The user interface function of the input unit 202 and the display function of the output unit 203 may be combined to form a touch panel screen. A communication unit 204 includes interfaces, such as a universal serial bus (USB) port for receiving input and output of data from the outside of the server and a local area network (LAN) port. A camera for obtaining video data, a medium that records video data, a medium for recording an operation time measured by this apparatus, and so on are connected to the communication unit 204 to input and output processing target data.

A storage unit 205 includes a hard disk drive and a flash memory. The storage unit 205 stores a computer program and data for causing the CPU 201 to execute or control the processes (described later) to be performed by an operating system (OS) and the server 100. In the following description, video data for use in processing, a detected operation execution history, and measured operation time data are registered in the storage unit 205. The computer program and data stored in the storage unit 205 are loaded to the RAM 206 according to the control of the CPU 201 and are processed by the CPU 201.

The RAM 206 has an area for storing the computer program and data loaded from the storage unit 205. The RAM 206 further has a work area for the CPU 201 to use in executing various processes. Thus, the RAM 206 can provide various areas as appropriate. The ROM 207 stores computer programs and data that do not need rewriting, such as set data and a startup program for the server 100. The functions and processes of the server 100, to be described later, are implemented by the CPU 201 reading and executing the programs stored in the ROM 207 or the storage unit 205. The CPU 201, the input unit 202, the output unit 203, the communication unit 204, the storage unit 205, the RAM 206, and the ROM 207 are connected to a bus 208.

Figure 3:
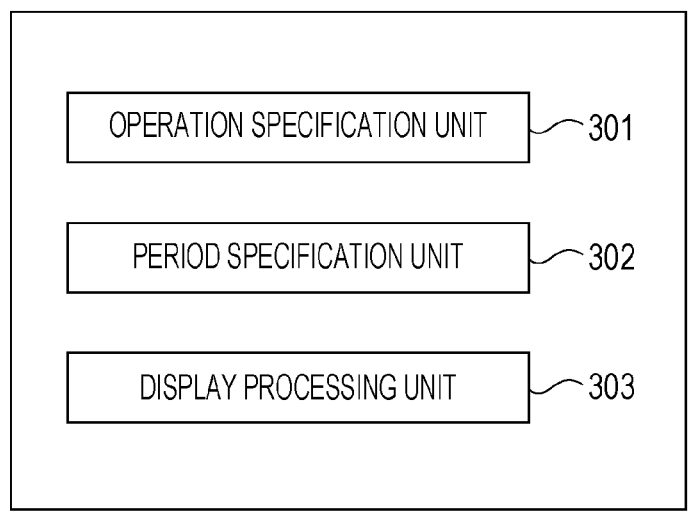
FIG. 3 is a functional block diagram of the server.

FIG. 3 is a functional block diagram of the server 100. An operation specification unit 301 specifies the detail of an operation by way of machine learning using a learning model on the basis of an image of frames constituting a moving image input from the image capturing apparatus 110. The operation specification unit 301 specifies the operation detail using only information on an image of one frame without using time-series information or the like indicating the time-series relationship of the frames. A period specification unit 302 specifies a plurality of frames whose operation details specified by the operation specification unit 301 are the same as an operation period of the specified operation detail. The period specification unit 302 also corrects the operation detail and the operation period as appropriate on the basis of preset operation order information. The operation order information is information indicating the details and the order of the plurality of operations included in a series of operations. A display processing unit 303 controls various pieces of information to be displayed on the display.

Figure 4:
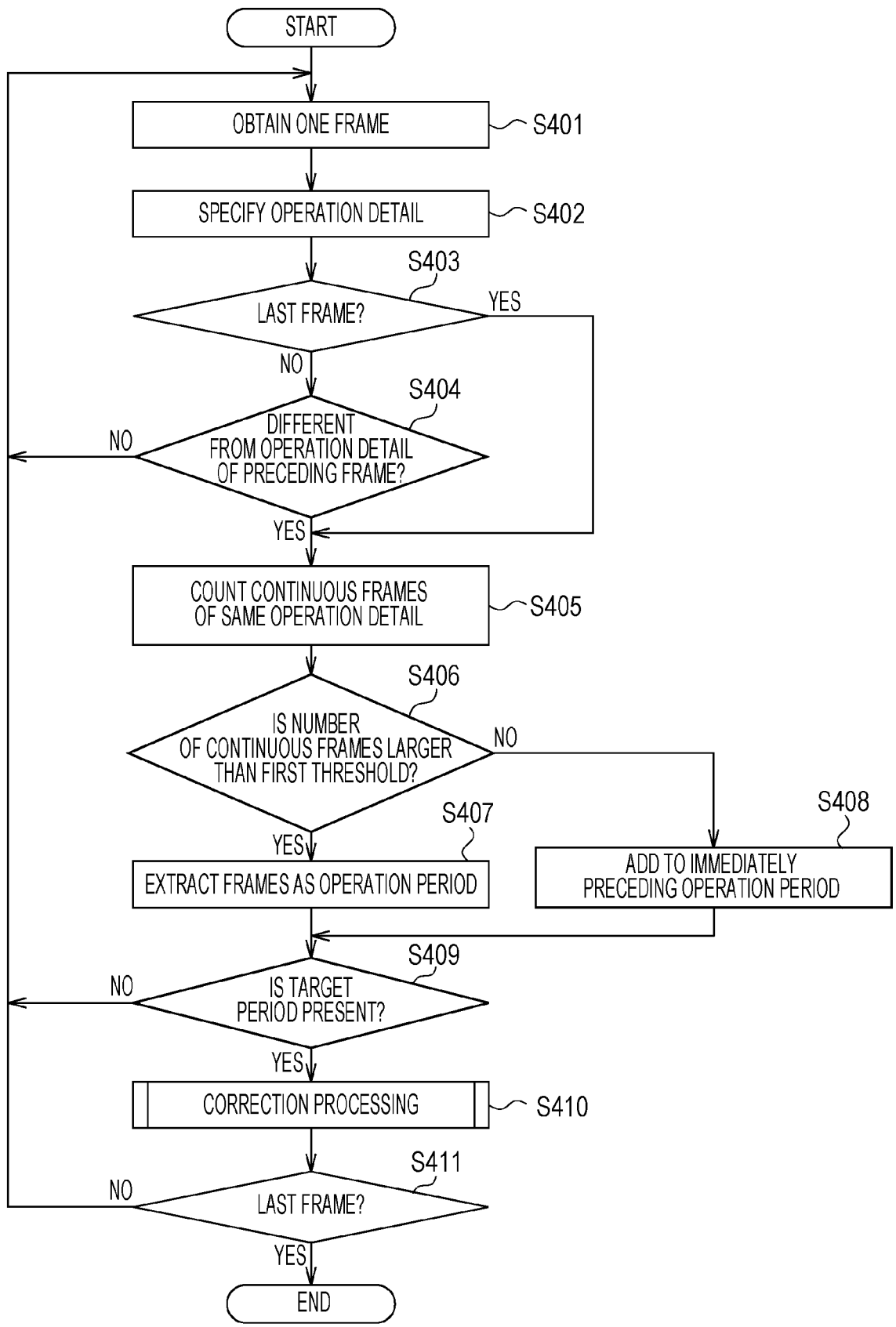
FIG. 4 is a flowchart illustrating operation detection processing.

FIG. 4 is a flowchart illustrating operation detection processing performed by the server 100. The operation detection processing is processing for detecting the detail of the operation on the basis of the image. In S401, the operation specification unit 301 obtains the moving image from the image capturing apparatus 110 in frame units via the communication unit 204. The acquisition of the moving image is performed sequentially in streaming format. In another example, the moving image obtained by the image capturing apparatus 110 may be temporarily stored in the storage unit 205, and the operation specification unit 301 may obtain the moving image stored in the storage unit 205 in frame units.

Next, in S402, the operation specification unit 301 specifies the detail of the operation on the basis of the frame image information obtained. This process is an example of the operation specification processing. Specifically, a learned model obtained by learning the operational features of a predetermined plurality of operation details is created in advance, and the operation specification unit 301 obtains the scores of the individual operation details. The operation specification unit 301 specifies an operation detail with a maximum score as an operation detail corresponding to the frame. In the present embodiment, operation labels for identifying the operation details are set in advance. The operation specification unit 301 records an operation label corresponding to the specified operation detail in a storage unit, such as the RAM 206, in association with the frame.

In the present embodiment, the operation label is an integer from 1 to 8. Among them, 1 to 7 indicate predetermined operation details, which are different from one another. Integer 8 indicates that the predetermined operation details are not detected. Furthermore, in the present embodiment, a video shot of a sequence of a plurality of operations with a predetermined execution order is the processing object, and the operation label is information with which the execution order can also be determined. In the present embodiment, operation labels 1, 2, and 3 indicate the order of the operations, and different numbers indicate different operation details.

For creation of the above-described learning model, various methods are present, and any method may be used. For example, for a method called deep learning, a large volume of data in which images of correct operation details are captured is prepared in advance, and the data is input to a network for learning to create a model.

The operation specification unit 301 need only specify the operation detail on the basis of the image, and specific processing therefor is not limited to the embodiment. In another example, images of typical motions of the individual operation details may be prepared in advance, and the operation specification unit 301 may compare the prepared images with an image of the processing object to specify the operation detail according to the result of comparison. In still another example, an area that is always touched during the operation is set in advance, and operation detail may be specified on the basis of, for example, whether the area has been touched or to what degree the area has been touched.

Next, in S403, the period specification unit 302 determines whether the frame image obtained in S401 is the last frame of the image. If the frame image is determined to be the last frame (S403: YES), the next frame is not present, and the period specification unit 302 advances the processing to S405. If the frame image is determined not to be the last frame (S403: NO), the period specification unit 302 advances the processing to S404. In S404, the period specification unit 302 determines whether the operation detail specified in the frame image obtained in S401 is an operation detail different from the operation detail of the immediately preceding frame. At that time, the period specification unit 302 refers to the operation labels. If it is a different operation detail (S404: YES), the period specification unit 302 advances the processing to S405. If it is the same operation detail (S404: NO), the period specification unit 302 advances the processing to S401.

In S405, the period specification unit 302 counts the continuous period of the operation detail of the frame obtained in S401 in reverse chronological order. Next, in S406, the period specification unit 302 compares the number of frames (the number of continuous frames) counted in S405 with a first threshold. The first threshold is a predetermined number of frames. If the number of continuous frames is determined to be larger than the first threshold (S406: YES), then the period specification unit 302 advances the processing to S407. If the number of continuous frames is determined to be equal to or less than the first threshold (S406: NO), the period specification unit 302 advances the processing to S408. In S407, the period specification unit 302 extracts the continuous frames as the operation period of the operation detail specified in S401, stores the start frame, the end frame, and the operation detail of the operation period in a storage unit, such as the RAM 206, and thereafter advances the processing to S409.

In S408, the period specification unit 302 adds the continuous frames to the immediately preceding operation period, and thereafter advances the processing to S409. This processing is a process that addresses the fact that there is a high possibility of misrecognition when the continuous period is extremely short. In S408, specifically, if the immediately preceding operation period is a period identified by operation label 2, the period specification unit 302 rewrites the operation detail of the continuous frames as the period of operation label 2 to merge the periods.

In S409, the period specification unit 302 determines whether a correction target operation period is present. In the present embodiment, if there is an operation period whose immediately preceding operation period is specified and whose immediately following operation period is specified, the period specification unit 302 specifies the operation period therebetween as the correction target operation period. The correction target operation period is hereinafter referred to as "target period". If the target period is present (S409: YES), the period specification unit 302 advances the processing to S410. If no target period is present (S409: NO), the period specification unit 302 advances the processing to S401. In an operation period including the last frame, the next operation period is not present. In this case, the processing is advanced to S410 as an exception.

In S410, the period specification unit 302 performs correction processing on the target period. Examples of the correction processing is correcting the duration of the target period, correcting misrecognition, and determining whether an operation is present. The correction processing will be described later with reference to FIG. 5. Next, in S411, the period specification unit 302 determines whether the frame obtained in S401 is the last frame. If the frame is determined to be the last frame (S411: YES), the period specification unit 302 terminates the operation detection processing. If the frame is determined not to be the last frame (S411: NO), the period specification unit 302 advances the processing to S401.

Figure 5:
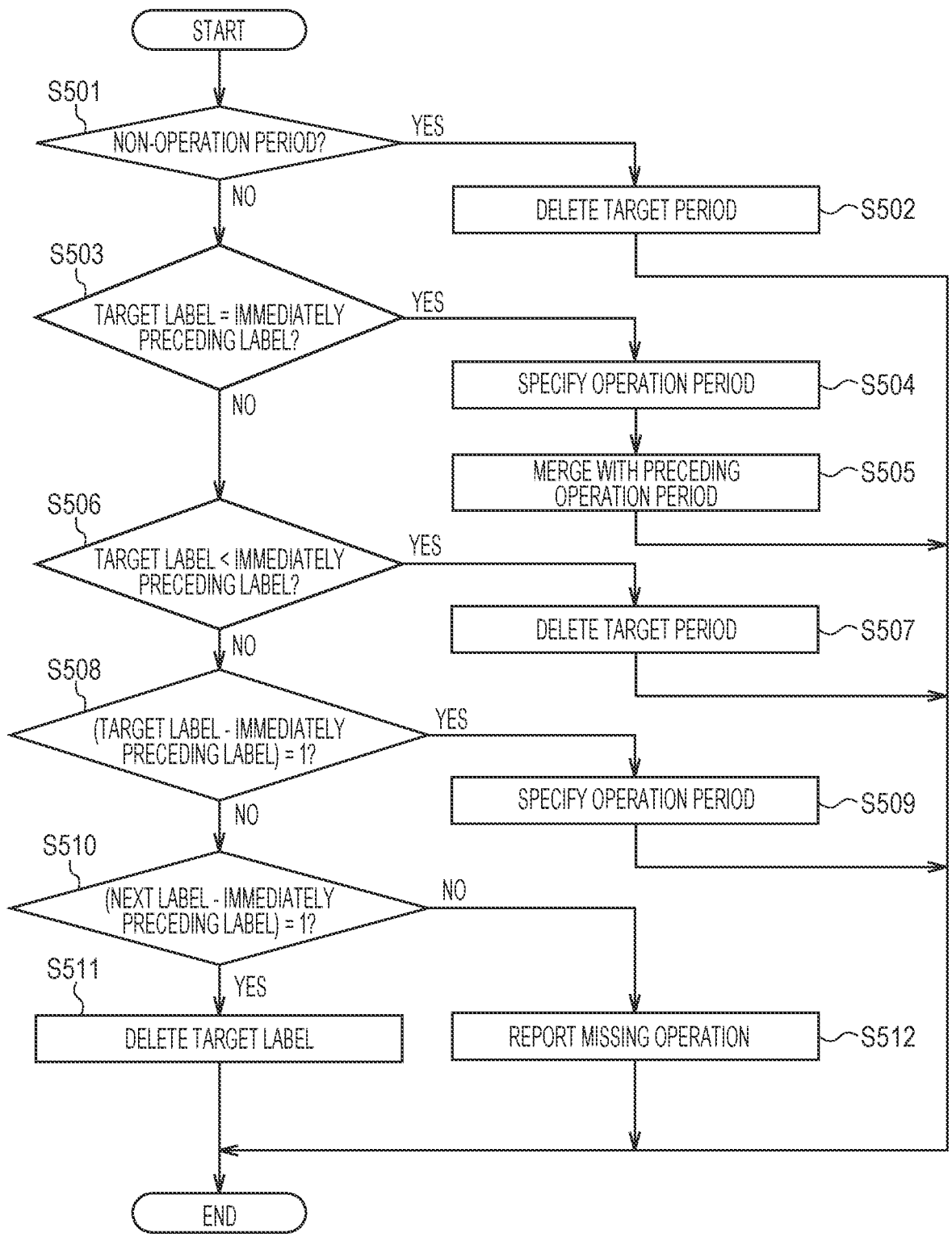
FIG. 5 is a flowchart illustrating correction processing.
Figure 6A:
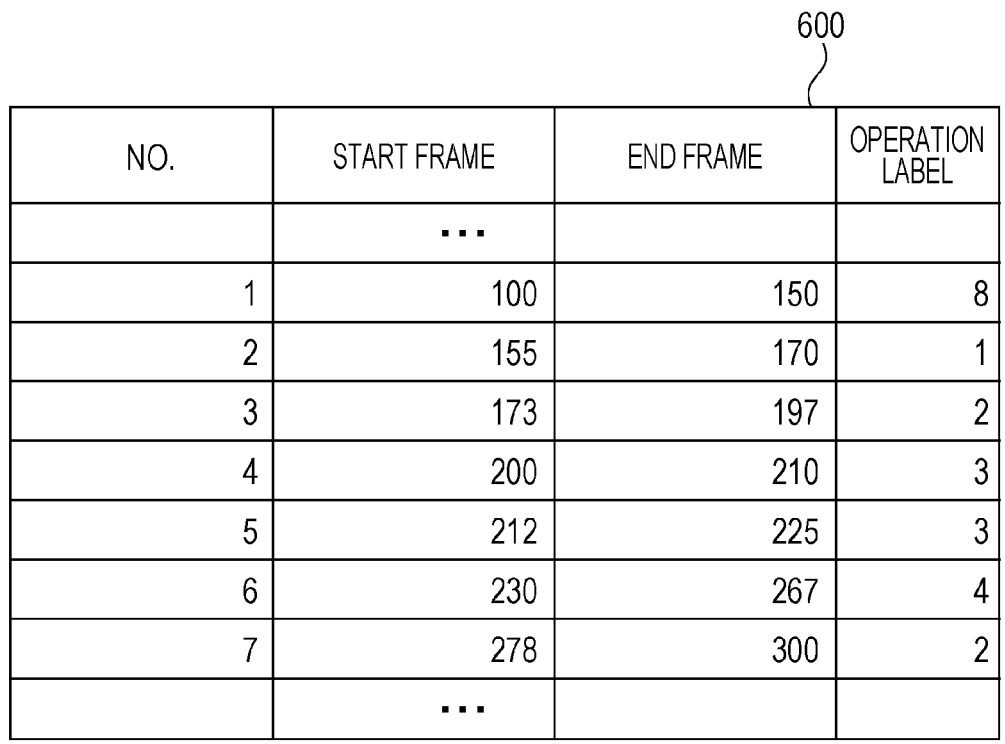
FIG. 6A is an explanatory diagram illustrating the correction processing.
Figure 6B:
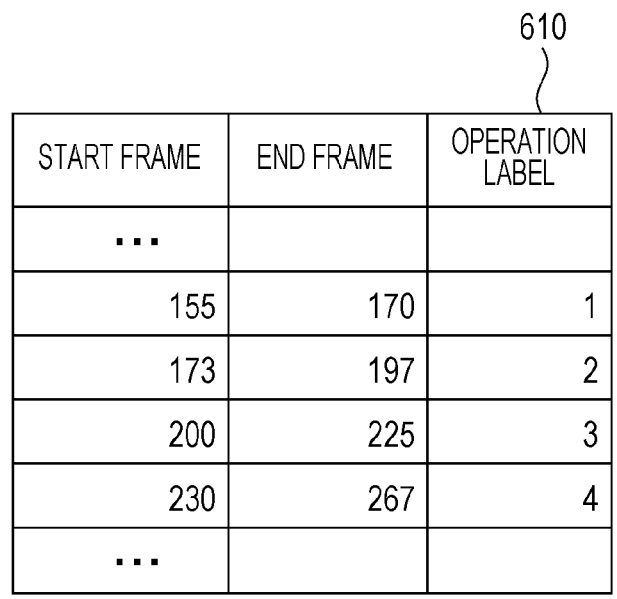
FIG. 6B is an explanatory diagram illustrating the correction processing.
Figure 7A:
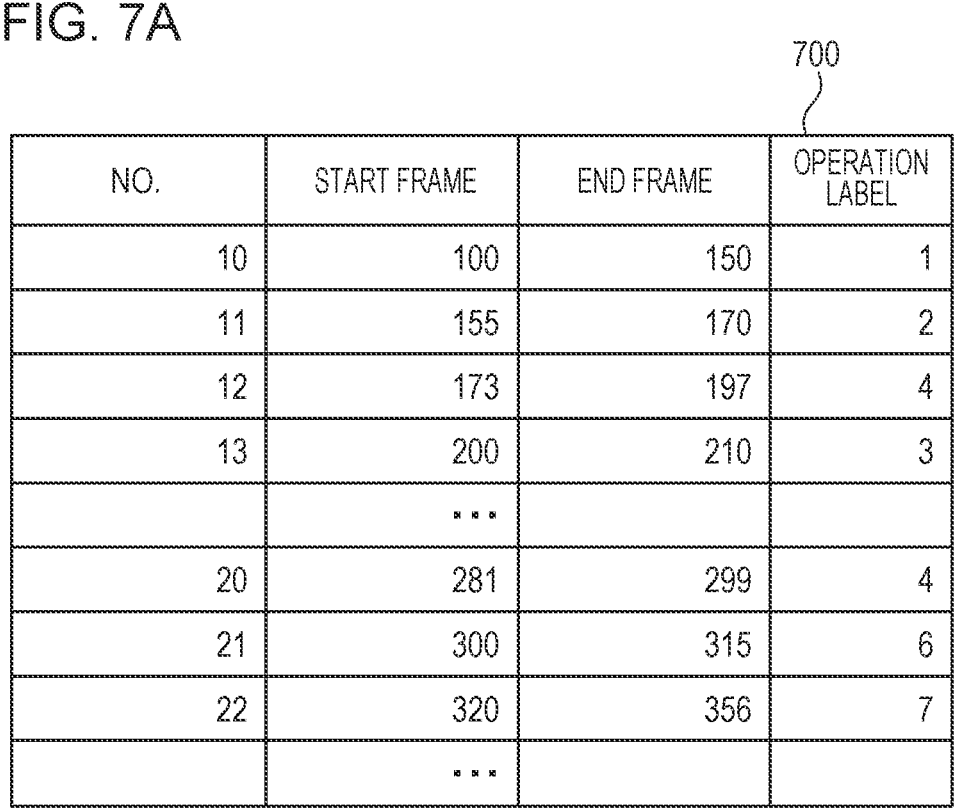
FIG. 7A is an explanatory diagram illustrating the correction processing.
Figure 7B:
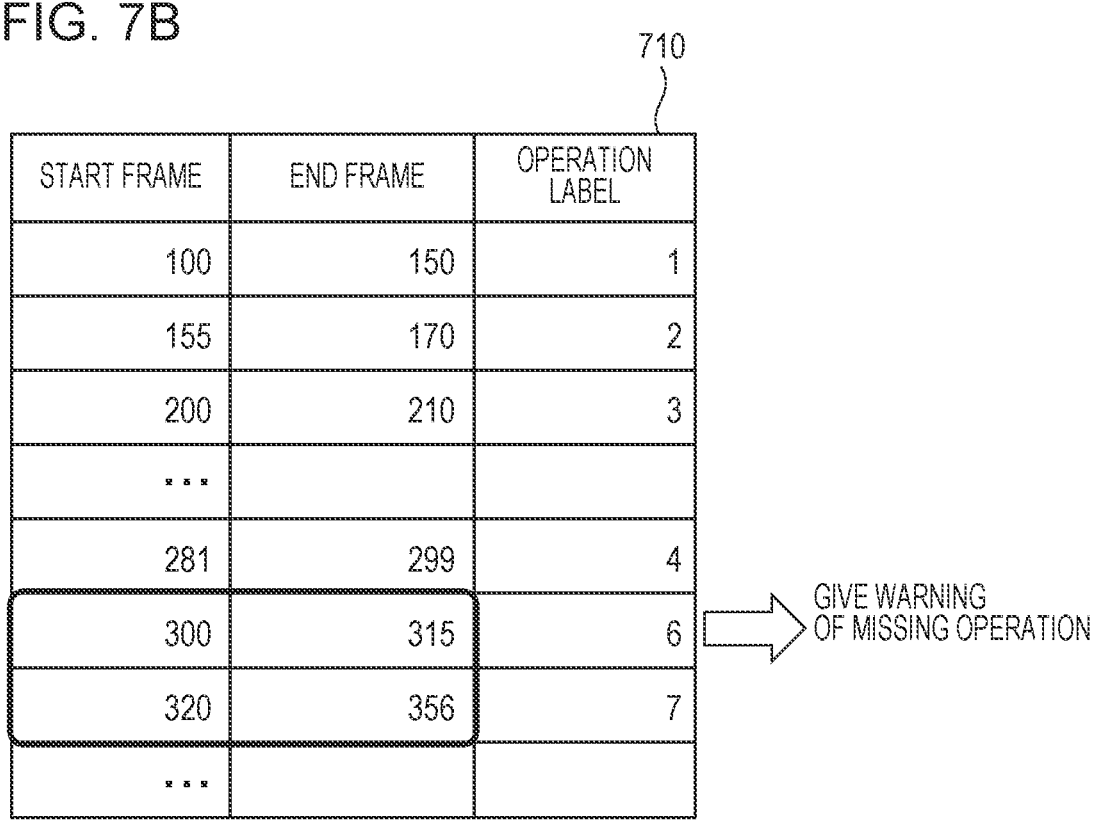
FIG. 7B is an explanatory diagram illustrating the correction processing.

FIG. 5 is a flowchart illustrating the details of the correction processing (S410) described with reference to FIG. 4. FIGS. 6A, 6B, 7A and 7B are explanatory diagrams of the correction processing. FIG. 6A illustrates an operation period string 600, and FIG. 6B illustrates an operation period string 610. The operation period string 600 is an operation period string obtained in the processing until S408 before the correction processing (S410) is performed. The operation period string 610 is an operation period string after correction processing is performed on the operation period string 600. Likewise, FIG. 7A illustrates an operation period string 700 before correction processing, and FIG. 7B illustrates an operation period string 710 after the correction processing. The operation period string 710 corresponds to the operation period string 700.

In the operation period strings 600 and 700, "No." that identifies the operation period, the start frame, the end frame, and the operation label are illustrated in association with one another. "No." is information that identifies the operation period. The operation label is information identifying the operation detail. In the present embodiment, the operation label is an integer from 1 to 8. Among them, 1 to 7 indicate predetermined operation details different from one another, and 8 indicates that predetermined operation details have not been detected.

In FIG. 5, in S501, the period specification unit 302 determines whether the target period is a non-operation period. Specifically, when the operation label of the target period is "8", the period specification unit 302 determines that the target period is a non-operation period. If the target period is determined to be a non-operation period (S501: YES), the period specification unit 302 advances the processing to S502. If the target period is determined not to be a non-operation period (S501: NO), the period specification unit 302 advances the processing to S503. In S502, the period specification unit 302 deletes the target period from the period corresponding to the operation detail corresponding to the target period. With that, the correction processing (S410) ends. In this case, the period specification unit 302 advances the processing to S411.

In contrast, in S503, the period specification unit 302 determines whether the operation labels of the target period and the immediately preceding operation period are the same. If the operation labels are determined to be the same (S503: YES), the period specification unit 302 advances the processing to S504. If the operation labels are determined to differ (S503: NO), the period specification unit 302 advances the processing to S506. In S504, the period specification unit 302 specifies the target period as a period corresponding to the assigned operation detail (operation label). Next, in S505, the period specification unit 302 merges the target period to the immediately preceding operation period. With that, the correction processing (S410) ends. For example, in the operation period string 600 of FIG. 6A, operation label 3 is specified in S504 as the operation detail of the operation period of No. 5, and the operation period of No. 5 is merged with the operation period of No. 4 in S505.

In S506, the period specification unit 302 determines whether the operation label of the target period is smaller in numerical value than the operation label of the immediately preceding operation period. Hereinafter, the operation label of the target period is referred to as "target label", and the operation label of the immediately preceding operation period is referred to as "immediately preceding label". If the target label is determined to be smaller than the immediately preceding label (S506: YES), the period specification unit 302 advances the processing to S507. If the target label is determined to be equal to or greater than the immediately preceding label (S506: NO), the period specification unit 302 advances the processing to S508. In S507, the period specification unit 302 deletes the target period from the period corresponding to the operation detail corresponding to the target period. With that, the correction processing (S410) ends. The operation period referred to in S506 may be any operation period before the target period and is not limited to the immediately preceding operation period.

In the present embodiment, when the operations are executed in a predetermined order, the operation labels ought to be in ascending order. Thus, the processes in S506 and S507 are performed to delete operations that do not satisfy the ascending order as misrecognition. For example, in the operation period string 600 of FIG. 6A, the operation label of the operation period of No. 7 is "2", which is less than the operation label "4" of the immediately preceding operation period of No. 6. For this reason, the operation period of No. 7 is deleted by the processing of S507. The processing of S507 is an example of the processing for deleting the target period when the operation detail of the target period is defined as operation detail before the operation detail of the immediately preceding operation period in the order of operations.

In S508, the period specification unit 302 determines whether the difference between the target label and the immediately preceding label is 1. The operation label corresponds to the order of the operation, as described above. Therefore, the processing of S508 is performed to determine whether the operation is performed according to the order of the operation. Accordingly, when the difference in operation label according to the operation order is another value other than 1, the period specification unit 302 makes the determination on the basis of the value. If the difference is determined to be 1 (S508: YES), the period specification unit 302 advances the processing to S509. If the difference is determined not to be 1 (S508: NO), the period specification unit 302 advances the processing to S510.

In S509, the period specification unit 302 specifies the target period as a period corresponding to the operation detail (operation label) specified in the target period. With this, the correction processing (S410) ends. For example, in the operation period string 600 of FIG. 6A, the operation period of No. 3 is specified as the operation period of operation label 2 in the processing in which the operation period of No. 3 is the target period. Likewise, in the processing in which the operation period of No. 4 is the target period, the operation period of No. 4 is specified as the operation period of operation label 3. The processing of S509 is an example of processing for specifying the target period as the period of the corresponding operation detail when the immediately preceding operation detail of the target period and the operation detail of the target period are defined as continuous operation details in the operation order.

In some cases, no preceding operation period is present like the operation period of No. 10 in the operation period string 700 of FIG. 7A. In this case, the period specification unit 302 determines NO in S503 and S506 and determines YES in S508 to determine the target period as the operation period. In another example, if the operation label of the correction target operation period is "1", and when no immediately preceding operation period is present, the operation label "1" may be determined to be of the operation detail. In this processing, the operation detail of the correction target operation period can be determined without comparing with the operation labels of the other operation periods.

In S510, the period specification unit 302 determines whether the difference between the operation label of the operation period next to the target period (the next label) and the immediately preceding label is 1. This process is processing for determining whether the next operation and the immediately preceding operation are continuous operations. If the difference in operation label is determined to be 1 (S510: YES), the period specification unit 302 advances the processing to S511. If the difference in operation label is determined not to be 1 (S510: NO), the period specification unit 302 advances the processing to S512. In S511, the period specification unit 302 deletes the target period from the period corresponding to the operation detail corresponding to the target period. With this, the correction processing (S410) ends.

If the difference between the next label and the immediately preceding label is 1, the immediately preceding operation period and the next operation period are periods corresponding to the continuous operation order. Accordingly, the target period seems to be a noise period. For this reason, in the present embodiment, the target period is deleted from the period corresponding to the corresponding operation detail in S511. For example, in the operation period string 700 of FIG. 7A, operation labels 2, 4, and 3 are respectively assigned to the operation periods of No. 11 to No. 13, in which case, when the processing of S511 is executed, the operation period of No. 12 is deleted. The processing of S510 is processing for determining whether the operation details of the immediately preceding period and the next period are defined as continuous operation details in the operation order. The processing of S511 is an example of processing for deleting the target period as the period of corresponding operation detail when the operation details of the immediately preceding period and the next period are defined as continuous operation details in the operation order.

In S512, the period specification unit 302 determines that an operation has been missing, outputs notification information indicating that there is a missing operation, and the correction processing (S410) ends. Specific examples of processing of the output of notification information include transmitting notification information to the personal computer (PC) or the like of the operation manager by mail, outputting a warning beep, and displaying notification information on the display.

For example, in the operation period string 700 of FIG. 7A, operation labels 4, 6, and 7 are respectively assigned to the operation periods of No. 20 to No. 22. In this case, NO is determined in S508, and NO is determined in S510, so that the processing of S512 is performed. It is determined in the processing of S511 that the operation of No. 5 has not been performed, and notification information indicating that the operation of No. 5 has been missing is output. In S512, predetermined specific processing is performed and is not limited to the processing of this embodiment. The above correction processing allows the operation period string 610 of FIG. 6B to be defined from the operation period string 600 of FIG. 6A, and the operation period string 710 of FIG. 7B to be defined from the operation period string 700 of FIG. 7A. The correction processing (S410) is processing for specifying the period of each operation corresponding to the operation order on the basis of the temporal relationship among the plurality of periods and the predetermined operation order and an example of the period specification processing.

Thus, the server 100 can increase the accuracy of specifying the operation details and the operation periods by taking the operation order into account.

Second Embodiment

Figure 8:
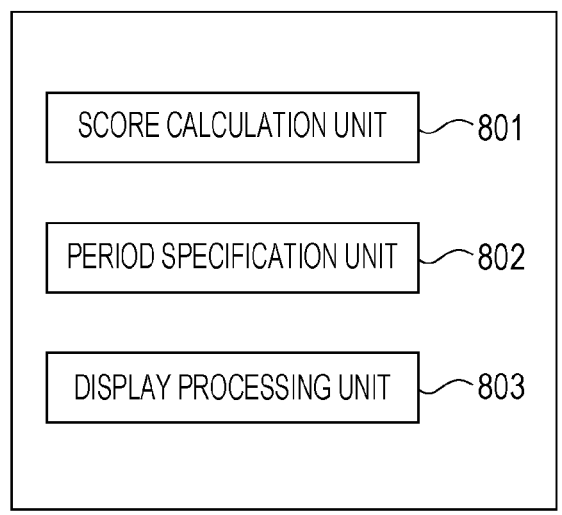
FIG. 8 is a functional block diagram of a server according to a second embodiment.

Next, an operation specification system according to a second embodiment will be described mainly regarding differences from the operation specification system according to the first embodiment. FIG. 8 is a functional block diagram of a server 100 of the operation specification system according to the second embodiment. The server 100 according to the second embodiment includes a score calculation unit 801, a period specification unit 803, and a display processing unit 804.

The score calculation unit 801 calculates the score of each operation by way of machine learning using a learning model on the basis of an image of frames constituting a moving image input from the image capturing apparatus 110. The score calculation unit 801 specifies the operation detail using only information on an image of one frame without using time-series information or the like indicating the time-series relationship of the frames. The period specification unit 802 detects the operation detail and the operation period on the basis of the score calculated by the score calculation unit 801, an output probability model, and a transit probability model. The output probability model is a model for presuming the operation detail from the score of each operation. The transit probability model is a model that defines the transit probability among a plurality of operations. The display processing unit 803 controls the display to display various kinds of information.

Figure 9:
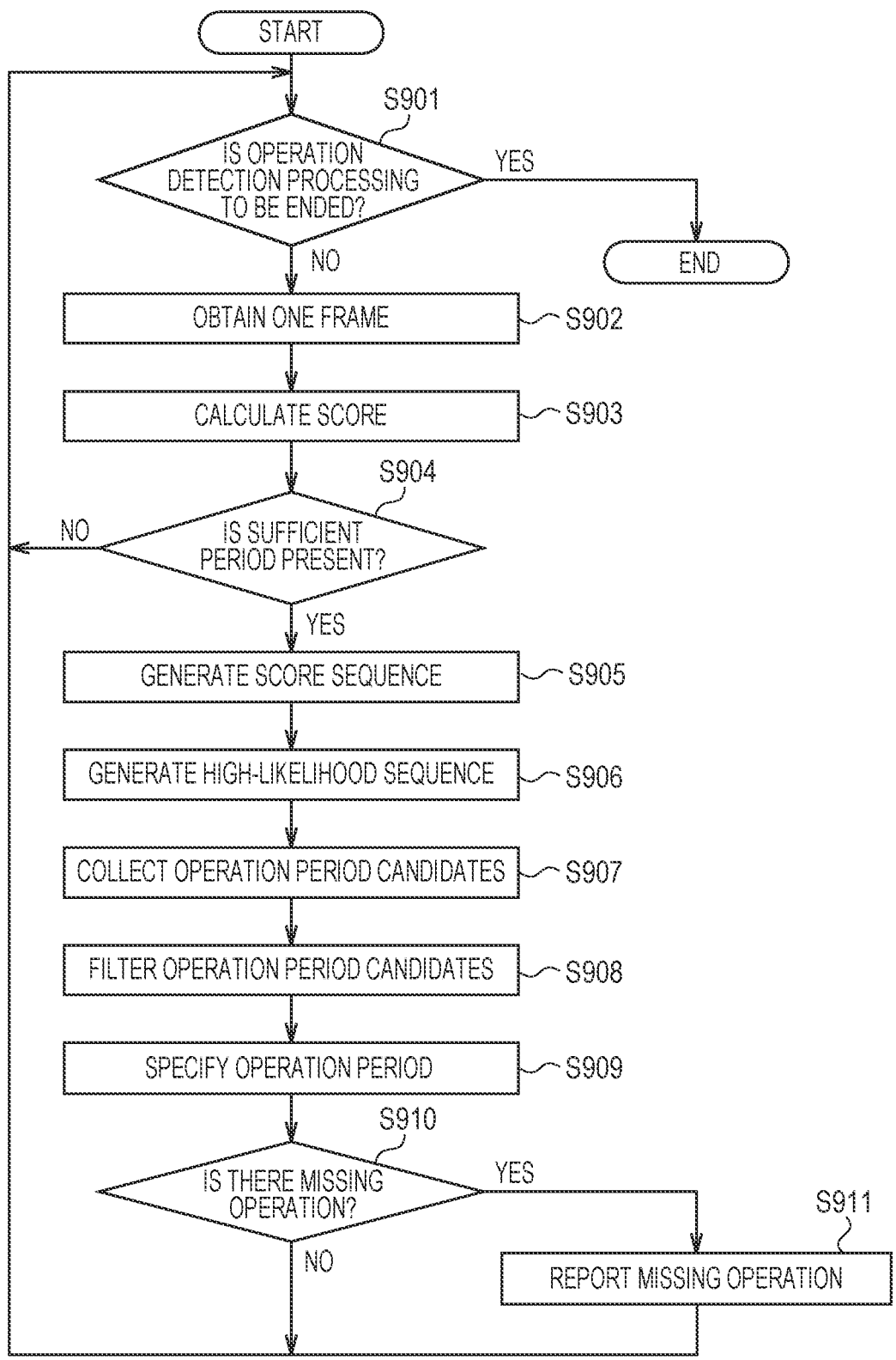
FIG. 9 is a flowchart illustrating operation detection processing according to the second embodiment.

FIG. 9 is a flowchart illustrating operation detection processing performed by the server 100. The operation detection processing is processing for detecting operation detail on the basis of an image. In S901, the score calculation unit 801 determines whether to terminate the operation detection processing. There are various methods for determination, and any method may be employed. Example methods include determination based on the time, determination based on whether a moving object is present, determination based on power off, and determination based on detection of the end of the image. If the score calculation unit 801 determines to terminate the operation detection processing (S901: YES), the operation detection processing ends. If the score calculation unit 801 determines not to terminate the operation detection processing (S901: NO), the processing proceeds to S902.

In S902, the score calculation unit 801 obtains a moving image in frame units from the image capturing apparatus 110 via the communication unit 204. The acquisition of the moving image is performed sequentially in streaming format. In another example, the moving image obtained by the image capturing apparatus 110 may be temporarily stored in the storage unit 205, and the operation specification unit 301 may obtain the moving image stored in the storage unit 205 in frame units.

Next, in S903, the score calculation unit 801 obtains the scores of the individual operation details for the frames obtained in S902. This process is an example of the score calculation processing. Specifically, a learned model obtained by learning the operational features of a predetermined plurality of operation details is created in advance, and the score calculation unit 801 obtains the scores of the individual operation details on the basis of the learned model and records the scores in a storage unit, such as the RAM 206.

For the creation of the above-described learning model, there are various methods, and any method may be employed. For example, for a method called deep learning, a large volume of data in which images of correct operation details are captured and data in which the operation details are specified is prepared in advance, and the data is input to a network for learning to create a model. When the frames of the moving image of the operation details are input to the learned model, the operation details are specified as an output.

The score calculation unit 801 need only calculate the scores of the individual operations on the basis of the image, and specific processing therefor is not limited to the embodiment. In another example, images of typical motions of the individual operation details may be prepared in advance, and the score calculation unit 801 may compare the prepared images with an image of the processing object to calculate the scores of the individual operations according to the result of comparison. In still another example, an area that is always touched during the operation is set in advance, and the scores of the individual operations may be calculated on the basis of, for example, whether the area has been touched or to what degree the area has been touched.

Next, in S904, the period specification unit 802 detects a period sufficient for the processing after S905 from the period included in the moving image obtained in S902. For example, assuming that the period from the start of a series of operation periods to the end is a sufficient period, the period specification unit 802 determines that a sufficient period has been detected when detecting the timing of the end of the series of operations. Specifically, for a series of operations in which four operations, operation 1, operation 2, operation 3, and operation 4, are performed in this order, the period specification unit 802 searches for the end of operation 4 on the basis of the scores, and when detecting the end of operation 4, determines that a sufficient period has been detected. The processing for detecting a sufficient period is an example of sequence-period determination processing for determining a sequence period on the basis of the scores. If a sufficient period is detected (S904: YES), the period specification unit 802 advances the processing to S905. If a sufficient period is not detected (S904: NO), the period specification unit 802 advances the processing to S901. The sufficient period is an example of the sequence period.

In S905, the period specification unit 802 collects scores corresponding to the sufficient period detected in S904 to generate a score sequence. Next, in S906, the period specification unit 802 generates a label sequence in which the label of a likely operation detail is added to each frame corresponding to each score in the score sequence generated in S905. For generating the label sequence, the period specification unit 802 uses an output probability model and a transit probability model. The transit probability model is a model that defines the probability of transit from an operation to another operation. The period specification unit 802 gives a likely label to a frame corresponding to each of the scores in the score sequence by calculating likelihood for the models.

Furthermore, the period specification unit 802 adjusts the likelihood on the basis of the duration of each operation. For example, the average and dispersion of the duration of each operation are measured in advance, and the normal distribution of the duration of each operation is created from the average and dispersion. In calculating the likelihood, if the generated duration of each operation deviates from the normal distribution of the duration of each operation, the period specification unit 802 decreases the likelihood.

There are various methods for adjusting the likelihood on the basis of the duration of each operation. Any method may be used by the period specification unit 802. For example, not the normal distribution but another distribution may be used. In another example, the average of the duration of each operation is calculated in advance, and the period specification unit 802 may adjust the likelihood on the basis of the difference from the average. The duration of each operation varies depending on the operator. For this reason, the period specification unit 802 may create a distribution according to the difference in duration on the basis of the duration of the operation of another operator, created in advance. The processing for changing the likelihood on the basis of the duration of each operation described above is not absolutely necessary.

Next, in S907, the period specification unit 802 counts the continuous period of the labels of the label sequence created in S906 in reverse chronological order and collects the continuous periods as operation period candidates. Next, in S908, the period specification unit 802 filters the operation period candidates collected in S907. Specifically, if the difference between the length of the operation period candidate and the predetermined length of the operation period is smaller than a threshold, the period specification unit 802 specifies the operation period candidate as the operation period. In contrast, if the difference is larger than the threshold, the period specification unit 802 does not specify the operation period candidate as the operation period. If the number of frames, of the frames included in the operation period candidate, in which the difference from a preset expected score is equal to or larger than a score threshold is less than the frame threshold, the period specification unit 802 specifies this operation period candidate as the operation period. In contrast, if the number of frames is equal to or larger than the frame threshold, the period specification unit 802 does not specify this operation period candidate as the operation period.

Figures 10A, 10B:
FIG. 10A is a diagram illustrating an example of storage of detection results.
FIG. 10B is a diagram illustrating an example of storage of detection results.

Next, in S909, the period specification unit 802 specifies the operation period candidate obtained by filtering in S908 as the operation period and records the start frame, the end frame, the label, and the likelihood of the operation period calculated in S906 in a storage, such as the storage unit 205. FIG. 10A illustrates an example a format in which the detection results are stored. As illustrated in FIG. 10A, the period specification unit 802 writes the information on the detected operation period by row.

Next, in S910, the period specification unit 802 determines whether there is a missing operation in the operation periods collected in S909. The period specification unit 802 detects a missing operation by comparing the detection results arranged in chronological order, as illustrated in FIG. 10B, with a predetermined defined order. For example, in the example of FIG. 10B, the operation labels of the detection results are arranged in the order of 3, 4, and 6, although the predetermined defined order of the operation labels is 3, 4, 5, and 6. For this reason, it is determined that operation label 5 is missing. If there is a missing operation (S910: YES), the period specification unit 802 advances the processing to S911. If there is no missing operation (S910: NO), the operation period specification unit 802 advances the processing to S901.

In S911, the period specification unit 802 outputs notification information indicating that there is a missing operation. Specific examples of processing of the output of notification information include transmitting notification information to the PC or the like of the operation manager by mail, outputting a warning beep, and displaying notification information on the display. After the notification information indicating that there is a missing operation has been output, the processing proceeds to S901.

Thus, the server 100 can increase the accuracy of specifying the operation details and the operation periods by modeling the score sequence.

The determination of whether there is a missing operation in S910 and the processing for notification information indicating that there is a missing operation in S911 are not absolutely necessary in the present embodiment, and it is only required to record the operation details. If processing for determination of a missing operation is not performed, the period specification unit 802 advances the processing to S901 after the processing of S909. After the determination of a missing operation has been completed, the storage area of the storage in which the detection results are recorded in S909 may be released. In S909, the period specification unit 802 not necessarily has to store all of the start frame, the end frame, the label, and the likelihood of the operation period calculated in S906. For example, the period specification unit 802 may store only an operation label necessary for determination of a missing operation.

In the present embodiment, in S904 for operation detection processing illustrated in FIG. 9, the period specification unit 802 detects the period of a series of operations as a sufficient period. However, it is only required that a certain length of period be detected in S904, and the detection target period is not limited to the embodiment. In another example, the period specification unit 802 may detect one operation period as a sufficient period. In this case, generation of a score sequence for the period of operation, determination of an operation period, and so on are performed in S905 and the subsequent steps.

In another example, the period specification unit 802 may detect a fixed number of frames, a fixed time, or the like as a sufficient period. In still another example, an area through which the body of an operator passes during the operation is set in advance, and when the operator passes through the area, the server 100 is notified of it from a sensor. When the server 100 receives the notification from the sensor, the period specification unit 802 may detect a sufficient period from the notification. In still another example, a program that operates during the operation is executed, a notification is given to the server 100 from the apparatus equipped with the program, and when receiving the notification, the period specification unit 802 may detect a sufficient period. In still another example, a device, such as a button, is prepared, and when the device is used, the notification may be given from the device to the server 100.

Third Embodiment

Next, an operation specification system according to a third embodiment will be described mainly regarding differences from the operation specification systems according to the other embodiments. Assuming that operation periods No. 1 to No. 6 are given, as illustrated in FIG. 11, respective correct operation labels for operation periods of No. 1 to No. 6 are 1, 2, 3, 3, 3, and 4, whereas operation labels 1, 2, 3, 4, 3, and 4 are specified by processing using a learned model. In this case, in the first embodiment, the period of No. 3 is specified as the period of operation label 3, and the periods of No. 4 to 6 are specified as the period of operation label 4. In other words, this result is different from the correct operation details. The operation specification system according to the third embodiment specifies correct operation periods even with such specification results.

Figure 12:
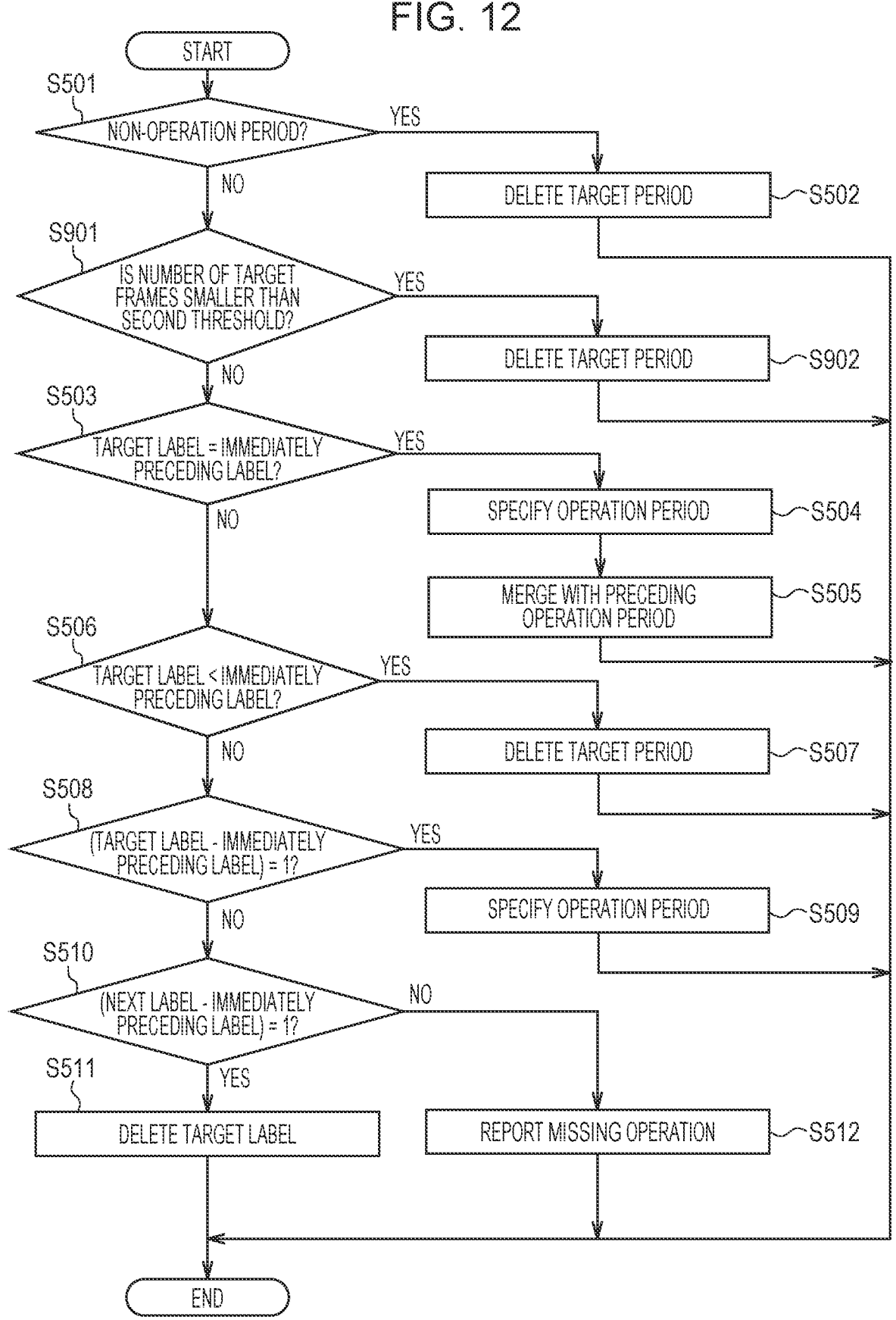
FIG. 12 is a flowchart illustrating the correction processing.

FIG. 12 is a flowchart illustrating the details of the correction processing (S410) performed by the server 100 according to the third embodiment. If in S501 the target period is determined not to be a non-operation period (S501: NO), the period specification unit 302 advances the processing to S901. In S901, the period specification unit 302 compares the number of frames included in the target period (the number of target frames) with a second threshold. The second threshold is a predetermined number of frames. The second threshold is a value greater than the first threshold referred to in S406 (FIG. 4). If the number of target frames is less than the second threshold (S901: YES), the period specification unit 302 advances the processing to S902. If the number of target frames is equal to or larger than the second threshold (S901: NO), the period specification unit 302 advances the processing to S503. In S902, the period specification unit 302 deletes the target period from the periods corresponding to the operation detail of the target period. With this, the correction processing (S410) ends.

The processing of S406 is for deleting the misrecognition results of about several frames, and the processing of S901 is for deleting the misrecognition result of some long period. If the second threshold is referred to in S406, even correct recognition results that are fragmented due to misrecognition may be removed. To prevent it, threshold processing is performed in two steps.

Referring to FIG. 11, the processes of S901 and S902 will be specifically described. Here, the first threshold referred to in S406 (FIG. 4) is set at eight frames, and the second threshold referred to in S901 is set at 15 frames. In the case of processing with the period of No. 4 as the operation period, the period of No. 4 is deleted as misrecognition from the processing object by the processes of S901 and S902 because the number of frames of the operation period of No. 4 is less than the second threshold. Next, in the case where processing is performed with the period of No. 5 as the operation period, the period of No. 5 is merged with the period of No. 3, which is the immediately preceding operation period. In other words, the period from No. 3 to No. 5 is specified as the period of operation label 3, and the subsequent period of No. 6 is specified as the period of operation label 4. The other configuration and processing of the operation specification system according to the third embodiment are the same as the configuration and processing of the operation specification systems according to the other embodiments.

Thus, the operation specification system according to the third embodiment can increase the accuracy of specification of operation details and operation periods by using two thresholds.

In a modification of the third embodiment, the server 100 may change the criterion in S506, so that the operation periods are specified in a way in which overlap of operations is allowed for. For example, the criterion of S506 may be set to "(target label+1)<immediately preceding label?", and if YES, the processing proceeds to S507, and if NO, proceeds to S508. This allows coping with, for example, a case in which the first operation is interrupted because of a shortage of parts during the processing, and the first operation is restarted because the parts arrive after the subsequent second operation is partially started. This also allows coping with a case in which the first operation is temporarily finished, and the subsequent second operation is started, and the first operation is performed again as a precaution. In this case, for example, an operation period string to which operation labels 3, 4, and 3 correspond is obtained. However, correct operations are not deleted with the second threshold if the operation has been performed for a certain length of time, so that operation details and operation periods can be correctly specified.

Fourth Embodiment

Next, an operation specification system according to a fourth embodiment will be described mainly regarding differences from the operation specification systems according to the third embodiment. The operation specification system according to the fourth embodiment also specifies correct operation periods even when the specification results described with reference to FIG. 11 are given, like the operation specification system according to the third embodiment.

Figure 13:
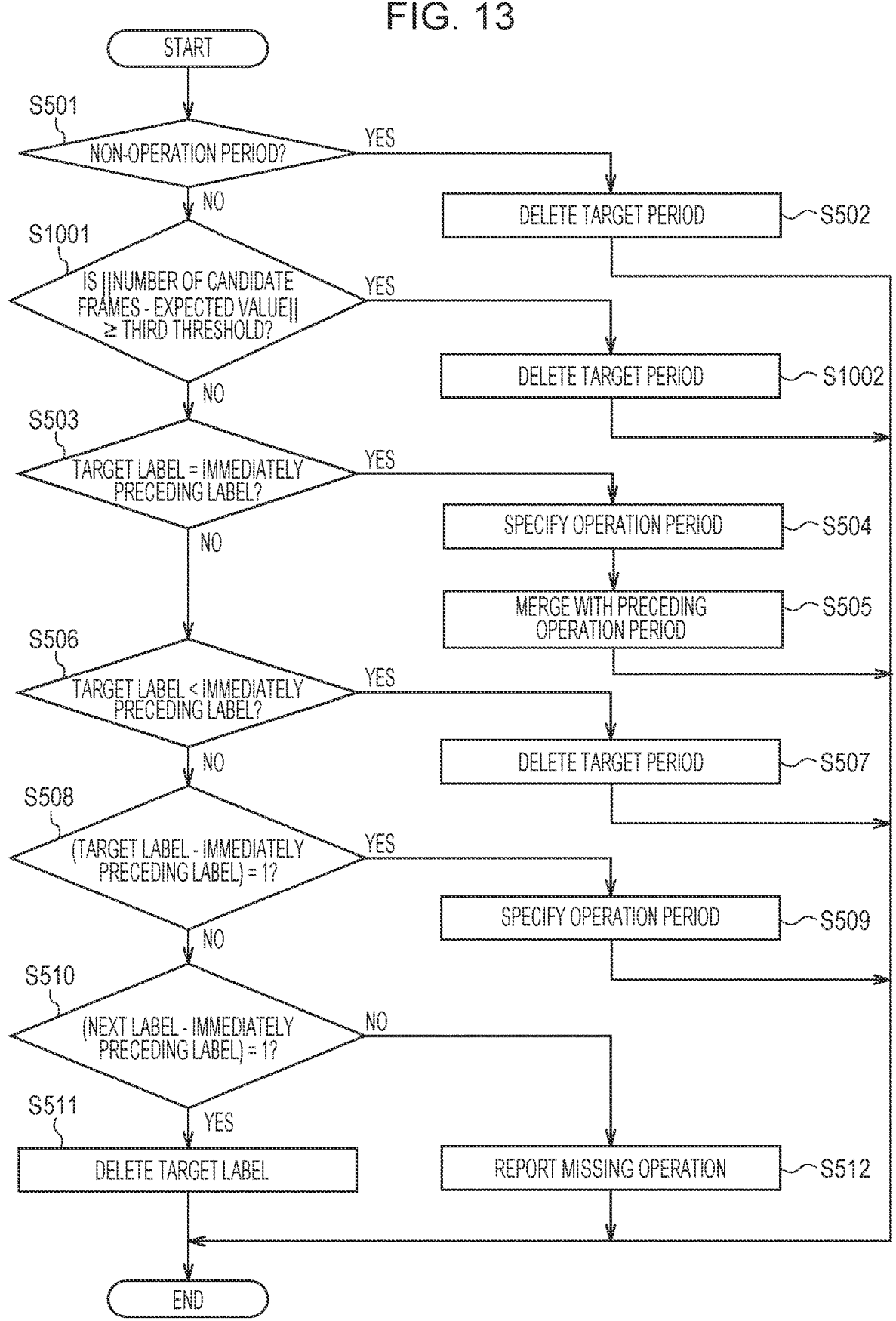
FIG. 13 is a flowchart illustrating correction processing according to a fourth embodiment.

FIG. 13 is a flowchart illustrating the details of the correction processing (S410) performed by the server 100 according to the fourth embodiment. If in S501 the target period is determined not to be a non-operation period (S501: NO), the period specification unit 302 advances the processing to S1001. In S1001, the period specification unit 302 obtains the absolute value of the difference between the number of frames included in the target period and an expected value. The period specification unit 302 compares the absolute value of the difference with a third threshold. FIG. 14 is a diagram illustrating examples of the expected value. The expected value is any value that is set according to the number of frames expected for the operation detail identified by the operation label. The third threshold is a predetermined threshold of a difference of the number of frames. The expected value and the third threshold are stored in, for example, the storage unit 205, in advance.

If the absolute value of the difference is equal to or greater than the third threshold (S1001: YES), the period specification unit 302 advances the processing to S1002. If the absolute value of the difference is less than the third threshold (S1001: NO), the period specification unit 302 advances the processing to S503. In S1002, the period specification unit 302 deletes the target period from the periods corresponding to the operation detail corresponding to the target period. With this, the correction processing (S410) ends.

Next, referring to FIG. 11, the processes of S1001 and S1002 will be specifically described. Here, the frame rate of the image is fixed, and the number of frames corresponds to time. The third threshold is set at ten frames. The difference between the number of frames (10) of the operation period of No. 4 and the expected value (50) of the operation label 4 is larger than the third threshold (10). For this reason, in the case where processing is performed with the period of No. 4 as the operation period, the operation period of No. 4 is deleted as misrecognition from the processing object. Next, in the case where processing is performed with the period of No. 5 as the operation period, the operation period of No. 5 is merged with the period of No. 3, which is the immediately preceding operation period. In other words, the period from No. 3 to No. 5 is specified as the period of operation label 3, and the subsequent period of No. 6 is specified as the period of operation label 4. The other configuration and processing of the operation specification system according to the fourth embodiment are the same as the configuration and processing of the operation specification systems according to the other embodiments.

Thus, the operation specification system according to the fourth embodiment can increase the accuracy of specification of operation details and operation periods by referring to the difference from the expected value and the threshold.

In a modification of the fourth embodiment, as described in the modification of the third embodiment, the server 100 may change the criterion in S506, so that the operation periods are specified in a way in which overlap of operations is allowed for.

Fifth Embodiment

Next, an operation specification system according to a fifth embodiment will be described mainly regarding differences from the operation specification systems according to the third embodiment. The operation specification system according to the fifth embodiment performs processing for changing the operation details as appropriate according to the order of operations. Assuming that a plurality of operation periods as illustrated in FIG. 15 are obtained, operation label 1 is specified for the period of No. 6 by processing using a learning model, although the correct operation label of the period of No. 6 is 6. The operation specification system of the present embodiment changes such an incorrect specification result to a correct operation detail.

Figure 16:
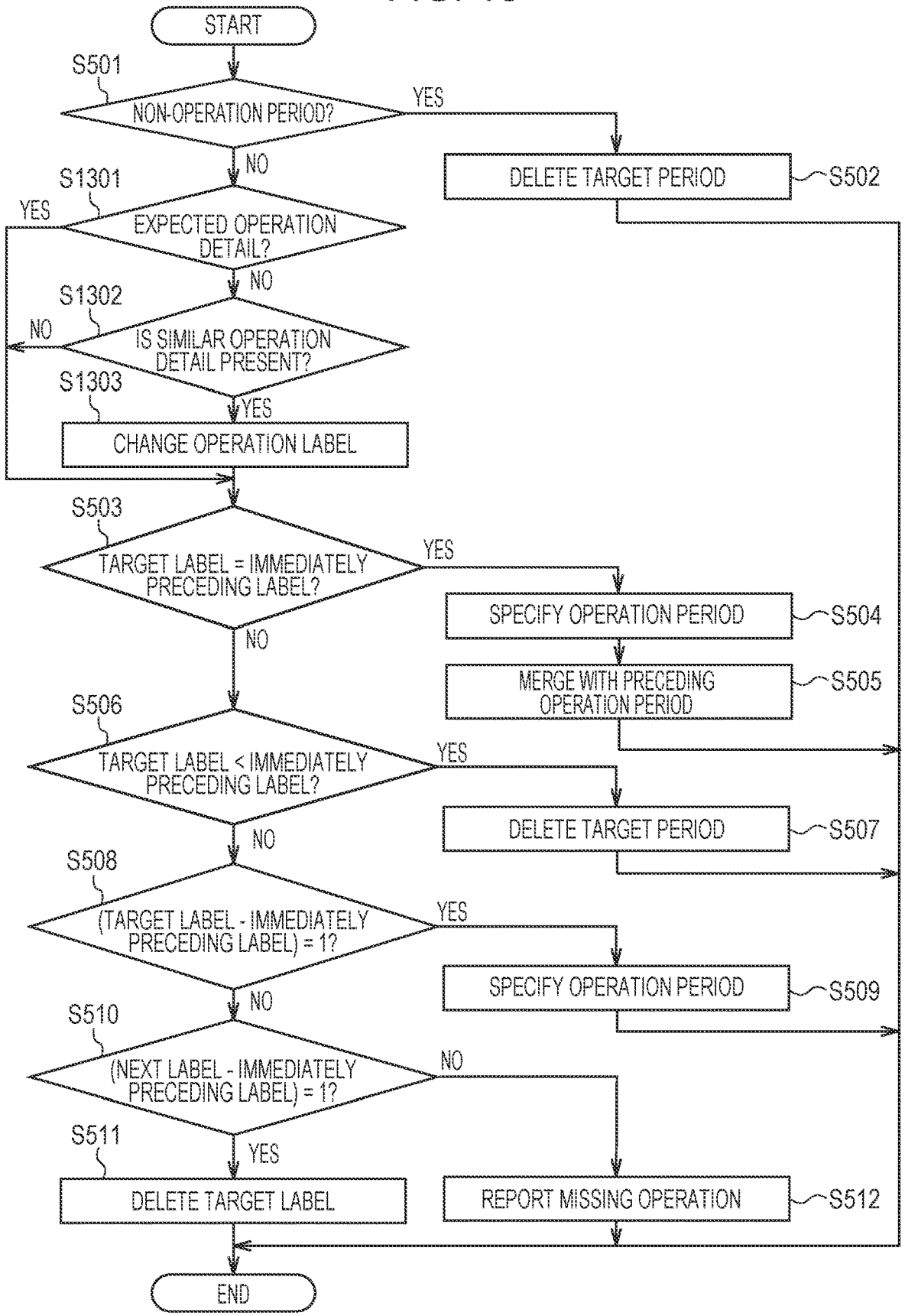
FIG. 16 is a flowchart illustrating the correction processing according to the fifth embodiment.

FIG. 16 is a flowchart illustrating the details of the correction processing (S410) performed by the server 100 according to the fifth embodiment. If in S501 the target period is determined not to be a non-operation period (S501: NO), the period specification unit 302 advances the processing to S1301. In S1301, the period specification unit 302 determines whether the operation detail of the target period is an operation detail expected from the order of operations. In the present embodiment, the period specification unit 302 determines that the target period is an operation period that is expected when the target label is a value obtained by adding 1 to the immediately preceding label. If the operation detail is expected operation detail (S1301: YES), the target period specification unit 302 advances the processing to S503. If the operation detail is not expected operation detail (S1301: NO), the period specification unit 302 advances the processing to 1302.

In S1302, the period specification unit 302 determines whether there is an operation detail similar to the operation detail of the target period with reference to a similarity table. The similarity table is information that defines an operation detail similar to each operation detail and is stored in, for example, the storage unit 205, in advance. FIG. 17 is a diagram illustrating an example of the similarity table. If it is determined that there is a similar operation detail (S1302: YES), the period specification unit 302 advances the processing to S1303. If it is determined that there is no similar operation detail (S1302: NO), the period specification unit 302 advances the processing to S503. In S1303, the period specification unit 302 changes the operation label of the target period to the operation label of the similar operation detail and thereafter advances the processing to S503.

Assume that processing is performed with the period of No. 6 illustrated in FIG. 15 as the operation period. Referring to the similarity table illustrated in FIG. 17, operation labels 6 and 8 are associated with operation label 1 as the similar operations. Accordingly, the period specification unit 302 determined in S1302 that there are similar operation details and advances the processing to S1303. In S1303, the period specification unit 302 changes the operation label of the target period from "1" to "6" that is subsequent to the immediately preceding operation label "5". Thus, in the example of FIG. 15, the periods of Nos. 6 and 7 are merged together and are specified as a period corresponding to operation label 6. The other configuration and processing of the operation specification system according to the fifth embodiment are the same as the configuration and processing of the operation specification systems according to the other embodiments. The processing from S1301 to S1303 is an example of processing for changing the operation detail of the target period to similar operation detail when the operation detail of the target period and the operation detail of the immediately preceding operation period do not match the operation detail determined in the order of operations.

Thus, the operation specification system according to the fifth embodiment can increase the accuracy of specifying the operation details and the operation periods by taking the operation order and the operation details into account.

In the above description, the processing of the server 100 described in the embodiments may be executed by a single server 100 changing the processes. For example, if misrecognition during the processing may be less likely to occur, such as when a simple operation is repeated, the server 100 preferably performs the processing according to the first embodiment. If there is a possibility of misrecognition, such as when mistake or unexpected movement can occur during operation, the server 100 preferably performs the processing according to one of the third to fifth embodiments. If there is little variation in the time required for each operation, or when it is assumed that the duration of a movement that may cause misrecognition is short, the server 100 preferably performs the processing according to the third embodiment. In contrast, when there is a wide range of variation in the time required for each operation or when it is assumed that the duration of a movement that may cause misrecognition is long, the server 100 preferably performs the processing according to the fourth embodiment.

In another example, when similar operations are included, the server 100 preferably performs the processing according to the fifth embodiment. In still another example, the server 100 may execute a combination of the processes according to a plurality of embodiments. For example, by executing the processing according to the third embodiment and the processing according to the fourth embodiment, the server 100 can further increase the accuracy of determination of misrecognition.

In the description of the above embodiments, the thresholds for use in determination are fixed values. The thresholds may not be fixed values, and may not be the number of frames. For example, the server 100 may learn the tendency of the period of misrecognition by machine learning and may change the thresholds according to the situation. Specifically, in the case where the tendency of operation time differs by operator, or in the case where the operation time changes according to the production plan, the server 100 may perform learning including elements other than the operation time and obtain a threshold suitable for the situation. In another example, the server 100 may use an operation recognition score for each frame, and if the difference between the second or third highest score and the highest score in the frame of misrecognition is small, may make the determination in consideration of the recognition results.

The present invention can increase the accuracy of specifying the operation details.

Other Embodiments

Having described preferable embodiments of the present invention, it is to be understood that the present invention is not limited to such specific embodiments and various modifications and changes can be made within the sprint and scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more processors configured to function as:
an acquisition unit configured to acquire frames constituting a moving image;
an operation specification unit configured to specify operation details based on the image of the frames using a learned model; and
a period specification unit configured to correct the operation details associated with the image of the frames based on time series relationship between a first period and a second period of periods included in the moving image and based on a predetermined operation order of a plurality of operation details and to specify a period of respective operation corresponding to the operation order, the first period corresponding to continuous frames in which a first operation detail is specified by the operation specification unit, the second period being different from the first period and corresponding to continuous frames in which a second operation detail is specified.

2. The information processing apparatus according to claim 1, wherein the second period is a period before the first period.

3. The information processing apparatus according to claim 2, wherein the second period is a period immediately preceding the first period.

4. The information processing apparatus according to claim 3, wherein the period specification unit specifies the first period as a period corresponding to the first operation detail when the second operation detail and the first operation detail are defined as operation details that continue in the operation order.

5. The information processing apparatus according to claim 3, wherein, when the first operation detail is defined as operation detail before the second operation detail in the operation order, the period specification unit deletes the first period from a period corresponding to the first operation detail.

6. The information processing apparatus according to claim 4, wherein, when a third operation detail of a third period that is a period next to the first period and the second operation detail are defined as operation details that continue in the operation order, the period specification unit deletes the first period from the period corresponding to the first operation detail.

7. The information processing apparatus according to claim 3, wherein, when the second operation detail and the first operation detail are equal, the period specification unit specifies the first period as the period corresponding to the first operation detail and merges the first period and the second period together.

8. The information processing apparatus according to claim 3, further comprising a changing unit configured, when the first operation detail and the second operation detail do not match the operation details determined in the operation order, to change the first operation detail to an operation detail that is preset as an operation detail similar to the first operation detail.

9. The information processing apparatus according to claim 1, wherein, when the first period is shorter than a predetermined threshold, the period specification unit deletes the first period from the period corresponding to the first operation detail.

10. The information processing apparatus according to claim 1, wherein, when a difference between an expected value that is preset in association with the first operation detail and a length of the first period is larger than a predetermined threshold, the period specification unit deletes the first period from the period corresponding to the first operation detail.

11. An information processing apparatus comprising:
one or more processors configured to function as:
an acquisition unit configured to acquire frames constituting a moving image;
a score specification unit configured to specify a score output by a learned model for a plurality of operations respectively based on the image of the frames; and
a period specification unit configured to specify an operation period based on a score sequence in which scores of a plurality of frames included in a predetermined period are combined and a predetermined operation order of the plurality of operations wherein the period specification unit specifies an operation period candidate based on the score sequence and the operation order, and when a difference between a length of the operation period candidate and a length of a predetermined operation period is equal to or less than a threshold, specifies the operation period candidate as the operation period.

12. The information processing apparatus according to claim 11, further comprising:
a sequence-period determination unit configured to determine a sequence period based on the scores,
wherein the period specification unit specifies the operation period based on the score sequence in which the scores of the sequence period are combined and the operation order.

13. The information processing apparatus according to claim 12, wherein the sequence-period specification unit determines one operation period as the sequence period.

14. The information processing apparatus according to claim 12, wherein the sequence-period specification unit determines a period from start to end of a series of operations as the sequence period.

15. The information processing apparatus according to claim 11, wherein the period specification unit specifies the operation period based on duration of the operation.

16. An information processing apparatus comprising:
one or more processors configured to function as:
an acquisition unit configured to acquire frames constituting a moving image;
a score specification unit configured to specify a score output by a learned model for a plurality of operations respectively based on the image of the frames; and
a period specification unit configured to specify an operation period based on a score sequence in which scores of a plurality of frames included in a predetermined period are combined and a predetermined operation order of the plurality of operations, wherein the period specification unit specifies an operation period candidate based on the score sequence and the operation order, and when, of frames included in the operation period candidate, the number of frames in which the difference between the score of frame and the preset expected score equal to or greater than a first threshold is less than a second threshold, specifies the operation period candidate as the operation period.

17. A method for information processing that an information processing apparatus executes, the method comprising:
acquiring frames constituting a moving image;
specifying operation details based on the image of the frames using a learned model; and
correcting the operation details associated with the image of the frames based on time series relationship between a first period and a second period of periods included in the moving image and based on a predetermined operation order of a plurality of operation details and specifying a period of respective operation corresponding to the operation order, the first period corresponding to continuous frames in which a first operation detail is specified by an operation specification unit, the second period being different from the first period and corresponding to continuous frames in which a second operation detail is specified.

18. A method for information processing that an information processing apparatus executes, the method comprising:
acquiring frames constituting a moving image;

specifying a score output by a learned model for a plurality of operations respectively based on the image of the frames; and specifying an operation period based on a score sequence in which scores of a plurality of frames included in a predetermined period are combined and a predetermined operation order of the plurality of operations, wherein the specifying the operation period comprises specifying an operation period candidate based on the score sequence and the operation order, and when a difference between a length of the operation period candidate and a length of a predetermined operation period is equal to or less than a threshold, specifying the operation period candidate as the operation period.

19. A non-transitory computer-readable storage medium storing a computer program for causing a computer to execute a method, the method comprising:

acquiring frames constituting a moving image;

specifying operation details based on the image of the frames using a learned model; and correcting the operation details associated with the image of the frames based on time series relationship between a first period and a second period of periods included in the moving image and based on a predetermined operation order of a plurality of operation details and specifying a period of respective operation corresponding to the operation order, the first period corresponding to continuous frames in which a first operation detail is specified by an operation specification unit, the second period being different from the first period and corresponding to continuous frames in which a second operation detail is specified.

* * * * *